United States Patent
Castleman

(10) Patent No.: US 10,786,729 B1
(45) Date of Patent: Sep. 29, 2020

(54) THERMOPILE ARRAY FUSION TRACKING

(71) Applicant: SONY INTERACTIVE ENTERTAINMENT INC., Tokyo (JP)

(72) Inventor: Dennis D. Castleman, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/297,292

(22) Filed: Mar. 8, 2019

(51) Int. Cl.
*A63F 13/213* (2014.01)
*A63F 13/217* (2014.01)
*G06N 3/08* (2006.01)
*G06K 9/62* (2006.01)
*G01K 7/42* (2006.01)

(52) U.S. Cl.
CPC .......... *A63F 13/213* (2014.09); *A63F 13/217* (2014.09); *G01K 7/427* (2013.01); *G06K 9/6289* (2013.01); *G06N 3/08* (2013.01)

(58) Field of Classification Search
CPC . G06F 3/01; G06F 3/011; G06F 3/012; G06F 3/0304; G06F 3/0308; G06F 3/0325; G06F 3/0346; G06F 3/04815; G02B 27/0172; G02B 2027/014; G02B 2027/017; G02B 2027/0093; G02B 2027/0138; G02B 2027/0178; G02B 2027/0179; G02B 2027/0187; A63F 13/06; A63F 13/20; A63F 13/211; A63F 13/213; A63F 13/428; A63F 2300/105; A63F 2300/1006; A63F 2300/1087; A63F 2300/8082; G01S 5/16; H04N 13/366
See application file for complete search history.

(56) References Cited

U.S. PATENT DOCUMENTS

| 2004/0143176 | A1 | 7/2004 | Foxlin | |
|---|---|---|---|---|
| 2009/0081923 | A1 | 3/2009 | Dooley et al. | |
| 2010/0013860 | A1* | 1/2010 | Mandella | G01B 21/04 345/650 |
| 2015/0220157 | A1* | 8/2015 | Marggraff | G06F 3/017 345/156 |

(Continued)

FOREIGN PATENT DOCUMENTS

KR 20170078073 7/2017

OTHER PUBLICATIONS

PCT/US2020/018584, "International Search Report and Written Opinion", dated Jun. 12, 2020, 12 pages.

*Primary Examiner* — Lawrence S Galka
(74) *Attorney, Agent, or Firm* — Kilpatrick Townsend & Stockton LLP

(57) ABSTRACT

A simultaneous location and mapping (SLAM)-enabled video game system, a user device of the video game system, and a computer-readable storage medium of the user device are disclosed. Generally, the video game system includes a video game console, a plurality of thermal beacons, and a user device communicatively coupled with the video game console. The user device includes a thermopile array, a processor, and a memory. The user device may receive thermal data from the thermopile array, the thermal data corresponding to a thermal signal emitted from a thermal beacon of the plurality of thermal beacons and detected by the thermopile array. The user device may determine, based on the thermal data, its location in 3D space, and then transmit that location to the video game system.

20 Claims, 7 Drawing Sheets

(56) References Cited

U.S. PATENT DOCUMENTS

2015/0263806 A1    9/2015   Puscasu et al.
2017/0180930 A1    6/2017   Mycek et al.
2018/0085673 A1*   3/2018   Birkedal ............... A63F 13/847

* cited by examiner

THERMOPILE ARRAY FUSION TRACKING

CROSS-REFERENCES TO RELATED APPLICATIONS

Not applicable

BACKGROUND

Simultaneous localization and mapping (SLAM) is a technique whereby a map is constructed of a particular environment while simultaneously keeping track of a target object's location within the environment. SLAM is used in robotic mapping and navigation in an open environment, including self-driving cars. SLAM may also be used in a closed environment, such as a room for playing video games or conducting a virtual meeting.

Existing SLAM techniques often use some type of camera configuration that contains one or more cameras, each camera containing one or more optical sensors. A variety of optical sensor types may be used, including one-dimensional (1D), 2D, 3D, etc. For example, in a case where two fixed-point 2D cameras are employed, each camera may detect a target object. The SLAM application's algorithm may determine the distance between the target object and each camera and triangulate this information to determine the location (e.g., position) of the target object. Often, especially, when the target may be moving and/or rotating through space, an inertial measurement unit (IMU) may also be employed, along with a camera apparatus, to detect the target's linear acceleration and rotation rate. The combination of sensor input from both an IMU and a camera apparatus helps to enable a higher degree of location-tracking accuracy. Other SLAM techniques also exist, including radar SLAM, WiFi-SLAM, etc.

However, there are at least two problems with existing SLAM-based applications. First, when employing an IMU to track the acceleration and rotation of a moving target through space, the IMU location-tracking accuracy degrades continuously over time due at least to offset error (also known as "drift"), thus decreasing the accuracy of SLAM techniques. Second, while combining sensory data received from other equipment (e.g., cameras) can help improve the SLAM algorithm's accuracy, this equipment currently can add significant cost and require a complex setup procedure. Therefore, there is a need to improve existing SLAM techniques by providing a lower-cost and yet highly accurate location-tracking solution.

BRIEF SUMMARY

Generally, techniques for determining user device location are described. In an example, a video game system includes a video game console, a plurality of thermal beacons, and a user device communicatively coupled with the video game console. The user device includes a thermopile array. The user device further includes a processor and a memory that stores instructions that, upon execution by the processor, cause the processor to perform operations. In one operation, the processor receives thermal data from the thermopile array. The thermal data corresponds to a thermal signal emitted from a thermal beacon of the plurality of thermal beacons and detected by the thermopile array. In another operation, the processor determines, based on the thermal data, a location of the user device in a three-dimensional (3D) space. In another operation, the processor transmits the location of the user device to the video game console.

In an example, the user device may also include an IMU. The processor of the user device may further perform operations. In one operation, the processor receives IMU data from the IMU. The IMU data includes acceleration data corresponding to an acceleration of the user device in the 3D space and orientation data corresponding to a rotational rate of the user device in the 3D space. In another operation, the processor determines the location of the user device in the 3D space by inputting, to a sensor fusion algorithm, the thermal data, the IMU data, and a previous location data. In one example, the processor determines an initial location of the user device based on the thermal data and independent of the IMU data of the IMU. In another example, the previous location data is stored on the user device. In yet another example, the sensor fusion algorithm utilizes an artificial intelligence model trained to determine the location. In another example, the sensor fusion algorithm utilizes a Kalman filter.

In an example, the sensor fusion algorithm generates a confidence value corresponding to the thermal data. The confidence value is based on a number of thermal beacons of the plurality of thermal beacons in a field of view of the thermopile array. The confidence value is used by the sensor fusion algorithm to determine the location of the user device.

In an example, the processor of the user device may further perform operations. In one operation, the processor receives second thermal data from the thermopile array. The second thermal data corresponds to a second thermal signal emitted from a second thermal beacon of the plurality of thermal beacons and detected by the thermopile array. The thermal beacon and the second thermal beacon are simultaneously in a field of view of the thermopile array. The location of the user device is further determined based on the second thermal data.

In an example, the thermal signal emitted by a thermal beacon of the plurality of thermal beacons includes an identifier unique to the thermal beacon. The identifier is used by the thermopile array to identify the thermal beacon from the plurality of thermal beacons.

In an example, each thermal beacon of the plurality of thermal beacons is positioned in a gaming environment. The 3D space is mapped to a portion of the gaming environment, and the thermal beacons are positioned such that, for a particular position of the user device within the 3D space, the thermopile array can detect thermal signals from at least two thermal beacons.

In an example, the user device is a video game controller. In another example, each beacon of the plurality of thermal beacons is an infrared diode.

A user device is also described. The user device includes a thermopile array. The user device further includes a processor and a memory that stores instructions that, upon execution by the processor, cause the processor to perform operations which are disclosed herein above.

A non-transitory computer-readable storage medium that stores instructions is also described. The instructions, upon execution on a user device, configure the user device to perform operations disclosed herein above.

In an example, the non-transitory computer-readable storage medium is further configured to perform calibration operations. In one operation, the user device determines a first location of the user device based on first thermal data corresponding to first thermal signals emitted from a first set of thermal beacons of the plurality of thermal beacons that are positioned in the 3D space. In another operation, the user device determines a second location of the user device based on second thermal data corresponding to second thermal signals emitted from a second set of thermal beacons of the plurality of thermal beacons that are positioned in the 3D space. In another operation, the user devices generates, based on the first location and the second location, a 3D model of the 3D space. In yet another operation, the user device stores the 3D model.

In an example, the non-transitory computer-readable storage medium is configured to perform further calibration operations. In one operation, the user device receives an instruction that requests a user to move the user device to the first location. In another instruction, responsive to the determining the first location, the user device receives an instruction that requests the user to move the user device to the second location.

Some embodiments of the present disclosure provide several technical advantages over current techniques for determining user device location. First, the present disclosure provides a method for achieving similar location-tracking accuracy compared to existing SLAM techniques while significantly reducing financial and human resource costs. For example, the cost of thermal beacons (e.g., infrared diodes) is inexpensive and easy to affix onto the walls of a room. Similarly, a thermal sensor is also inexpensive, compared to the cost of one or more optical sensors (e.g. components of a camera). Additionally, the present disclosure may not only be used as an alternative to existing SLAM techniques, but may be used to improve the accuracy of location-tracking in existing systems and methods.

A further understanding of the nature and the advantages of the embodiments disclosed and suggested herein may be realized by reference to the remaining portions of the specification and the attached drawings.

DETAILED DESCRIPTION

Generally, systems and methods for utilizing a thermal sensor array to determine a user device location are described. Typically, a user may operate a user device (e.g., a video game controller, headset, paddle, etc.) within a 3D space, the 3D space being mapped to a portion of a physical space (e.g., a video game room). The user may interact with the user device by moving it in different directions and at different speeds within the 3D space. The user device (e.g., a video game controller, a virtual reality (VR) headset, etc.) will also typically interact with a computing hub (e.g., a video game console), which may in turn interact with other devices and cause them to perform a function (e.g., change a video image being displayed on a television (TV)). One of the interactions the user device may have with the computing hub is to determine its location within the 3D space and send the location to the computing hub. The user device may determine its location by utilizing a thermal sensor array of the user device. The thermal sensor array may be configured to receive thermal signals from one or more thermal beacons (e.g., IR LEDs), which are positioned in the physical space (e.g., affixed to the walls of the game room). Based on thermal data received from the thermal sensor array, the user device may determine its location in the 3D space, and transmit that location to the computing hub. The user device may also use the thermal data, together with other sensor data to determine its location.

In an example, the user device may also include and receive data from an IMU. The user device may also have stored a previous location (e.g., last determined location). In addition to the thermal data received from the thermal sensor array, the user device may input the IMU data and previous location data into a fusion sensor algorithm. The fusion sensor algorithm may use the different data inputs to determine the user device location. The user device may then store that location data to be used in the future, for example, as a previous location data.

The above examples are provided for illustrative purposes. The embodiments of the present disclosure are not limited as such. The embodiments similarly apply to a larger number of SLAM applications using thermal sensor arrays to determine location. These and other embodiments are further described herein next.

Figure 1:
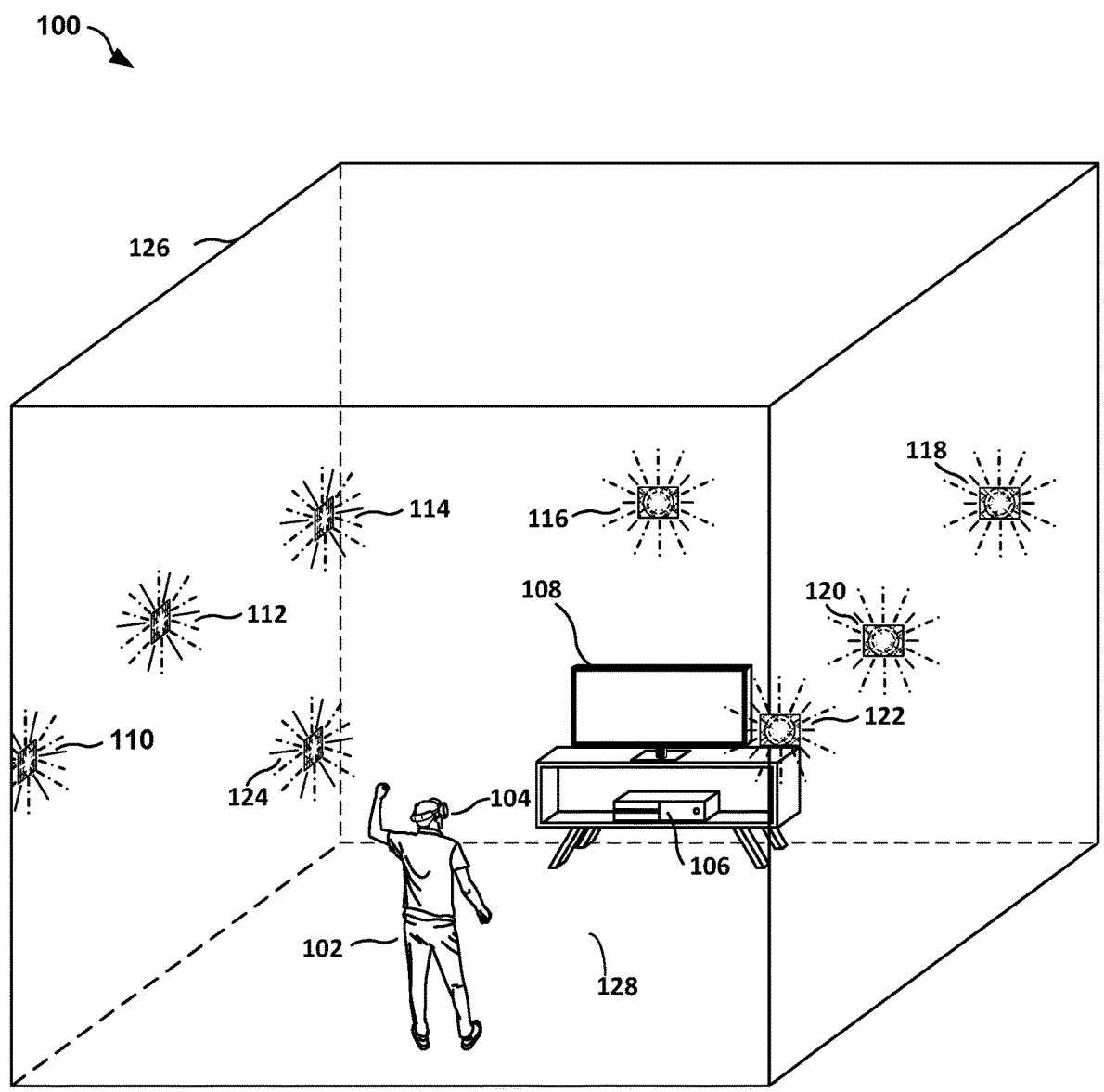
FIG. 1 illustrates an example of a system using a thermopile array to implement SLAM application, according to an embodiment of the present disclosure.

FIG. 1 illustrates an example of a system 100, which includes a user device that further includes a thermal sensor array for use in determining a location of the user device, according to an embodiment of the present disclosure. In an example, the location determination implements a SLAM application. In FIG. 1, a gaming room 126 is depicted, wherein a user 102 wears a gaming headset 104 (e.g., the user device) to interact with a video game console 106. The video game console in turn may cause, for example, a TV 108 to display movement of an object on the screen which corresponds to the gaming headset's 104 movement. It should be understood that although FIG. 1 and subsequent illustrations may depict a SLAM application within a gaming environment, the use of this type of scenario should not be construed to pose a limitation on the scope of the disclosure. For example, in some embodiments, a physical space such as a meeting room or theater space may be used and other location determination applications are possible. In general, and continuing with the gaming room example, the gaming room 126 may allow for a plurality of thermal beacons 110-124 (e.g., IR LEDs) to be positioned in the room 126.

The user device 104 should include one or more thermal sensors (e.g., thermal sensor array or thermopile array) that are configured to receive thermal signals from one or more thermal beacons 110-124 positioned in the room 126. It should be understood that, although a thermopile array is type of thermal sensor that is depicted in FIG. 1 and subsequent figures, other types of thermal sensors may be used as a suitable thermal sensor. Furthermore, although gaming headset 104 is a type of user device that is depicted below, other types of mobile computing devices that include thermal sensors may be used as a suitable user device. This may include, but is not limited to, a video game controller, a gaming paddle, a mobile phone, a laptop, etc.

In some embodiments, each beacon of the plurality of thermal beacons 110-124 positioned in the room 126 may emit a thermal signal (e.g., infrared light). Optionally, each thermal signal emitted by a thermal beacon may include an identifier that is unique to the particular thermal beacon. For example, the identifier may be a modulated frequency of the infrared signal, which the thermopile array of user device 104 may be able to detect as a unique signal that corresponds to a particular thermal beacon in the room. As discussed in more detail below, in some embodiments, user device 104 may be able to improve its location-tracking accuracy by triangulating its position relative to at least two thermal beacons in the room 126.

In some embodiments, the plurality of thermal beacons 110-124 may be positioned in the room 126 such that, for a particular position of the user 102 within the 3D space of the room 126, the thermopile array of the user device 104 may be able to detect thermal signals from at least two thermal beacons of the plurality within the thermopile array's field of view. For example, as depicted in FIG. 1, thermal beacons 110-124 may each be affixed to a wall of the gaming room 126, and be substantially equally spaced from each other. During a calibration process (discussed in detail below), the user 102 may be instructed to move the user device 104 in an arc-like (e.g., 360 degree) motion. This calibration process may allow the user device 104 to construct and store on the user device 104 a 3D model of the 3D space, the 3D space corresponding to at least a portion of the room 126, and in which the user 102 may operate the user device 104 within. The calibration process may also verify that the thermopile array's field of view can detect at least two signals from a particular point within the 3D space in the room 126. In other embodiments, and depending on the type of SLAM application (e.g., the range of use intended for the user device within the room 126), two or more thermal beacons may be positioned in the physical space 126 in order for the user device 104 to determine its location.

Figure 2:
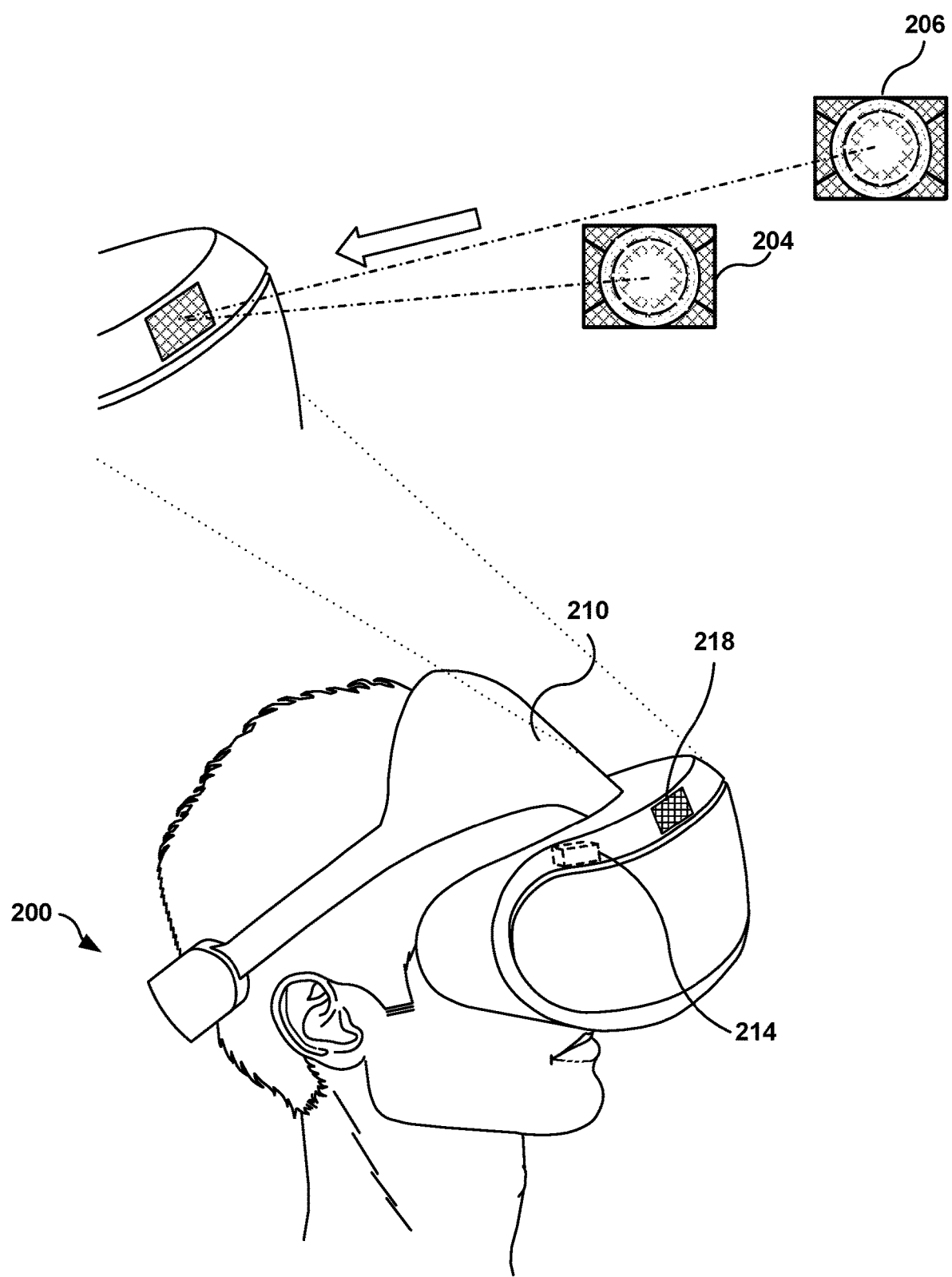
FIG. 2 illustrates a user device that includes a thermopile array which receives signals from one or more thermal beacons, according to an embodiment of the present disclosure.

FIG. 2 illustrates an example close-up view of a user device 200 which receives thermal signals from one or more thermal beacons. The user device 200 is a gaming headset and may correspond to the user device 104 of FIG. 1. In an example, the headset 200 is a virtual reality (VR) or augmented reality (AR) headset. Generally, the headset 200 includes a housing 210 that may integrate components such as a display, processing units, memories, audio systems, I/O ports, graphics processing units, network communications devices, and other electronic, electrical, and mechanical components. The housing 210 further integrates (e.g., houses, attaches, or holds) additional components for location tracking, such that the additional components are rigidly connected with the housing 210. These components include, for instance, an IMU 214 and a thermopile array 218.

In an example, the IMU 214 includes accelerometer(s), gyroscope(s), and magnetometer(s). An accelerometer(s) measures movement along the X, Y, and Z axes. Generally, a gyroscope(s) measures 360 degree rotation. A magnetometer(s) determines orientation towards a magnetic field. As such, inertial data (e.g., including acceleration data, orientation data, and/or rotation data) indicative of a rotational motion of the headset 200 can be generated from readings of these sensors. Translational motion can also be generated based on speed and time of the user's 102 head motion via the headset 200. For instance, a motion vector is defined. Speed is measured from the acceleration and distance is measured as a function of speed and time. Direction is derived from the rotation and orientation. The motion vector defines the distance and direction of the motion, thereby allowing a tracking of the translational motion of the headset 200 along the X, Y, and Z axes. Thus, by defining inertial data, distance, and direction in a motion vector, the motion of the user's headset 200 can be tracked over time. Accordingly, based on the inertial data, and by performing integration(s) with respect to time, the location of headset 200 may be determined for a specific point in time in 3D space. A processing unit of the IMU 214 (e.g., a signal processor) may generate location data from data sensed by such IMU sensors.

As described above, one of the limitations with utilizing an IMU to determine location is that an IMU typically suffers from accumulated error. Because a SLAM application may be continually integrating acceleration with respect to time to calculate velocity and position, any measurement errors, however small, are accumulated over time, leading to drift. Drift is measurement of the difference between where a user device may initially determine it is located compared to its actual location. As such, the headset 200 also may contain a thermopile array 218, which the headset 200 can use to continually correct for drift errors and determine a more accurate location.

In an example, the thermopile array 218 is thermal infrared sensor array that is configured to measure temperature of one or more thermal beacons 204, 206 from a distance by detecting the infrared energy from the one or more thermal beacons 204, 206 (which may correspond to one or more of the thermal beacons 110-124 of FIG. 1). The thermopile array may include thermocouples that are connected on a silicon chip, which are configured to convert thermal energy received from a thermal signal of a thermal beacon 204, 206 into electrical energy in the form of a voltage output. Typically, the input thermal energy is proportional to the voltage output. Thus, because a user device 200 may detect more light energy (e.g., signal) the closer it is to a thermal beacon (e.g., creating a higher temperature differential), a thermopile array can be used to measure the distance between a user device 200 and a particular thermal beacon. In some embodiments, a processing unit connected to the thermopile array 218 (e.g., a signal processor which be integrated with the thermopile array 218) may transmit thermal data, corresponding to distance from the user device 200 to the thermal beacon 204, 206, based on the voltage output by an element of the thermopile array 218. In some embodiments, the thermopile may be composed of a single element (e.g., pixel), dual element, etc. In other embodiments, the thermopile may be a linear (e.g., 16, 32) or area (e.g., 32×32) array of pixels. Although the embodiments discussed herein discuss a thermopile array, this disclosure should not be construed to be so limiting. In some embodiments, any given pixel(s) of the thermopile array 218 may be able to detect thermal signals from one or more thermal beacons at a given time, provided that the thermal beacon is within the pixel's field of view. As discussed above, and further below in regards to FIG. 3, the thermal data generated from the thermopile array 218 may be used to triangulate the distance between the user device 200 and at least two thermal beacons 204, 206 to determine a 3D location of the user device 200 in a physical space 126. In some embodiments, the thermal data from the thermopile array may also be combined with the IMU data to output a 3D location of the user device 200 in a physical space 126.

Figure 3:
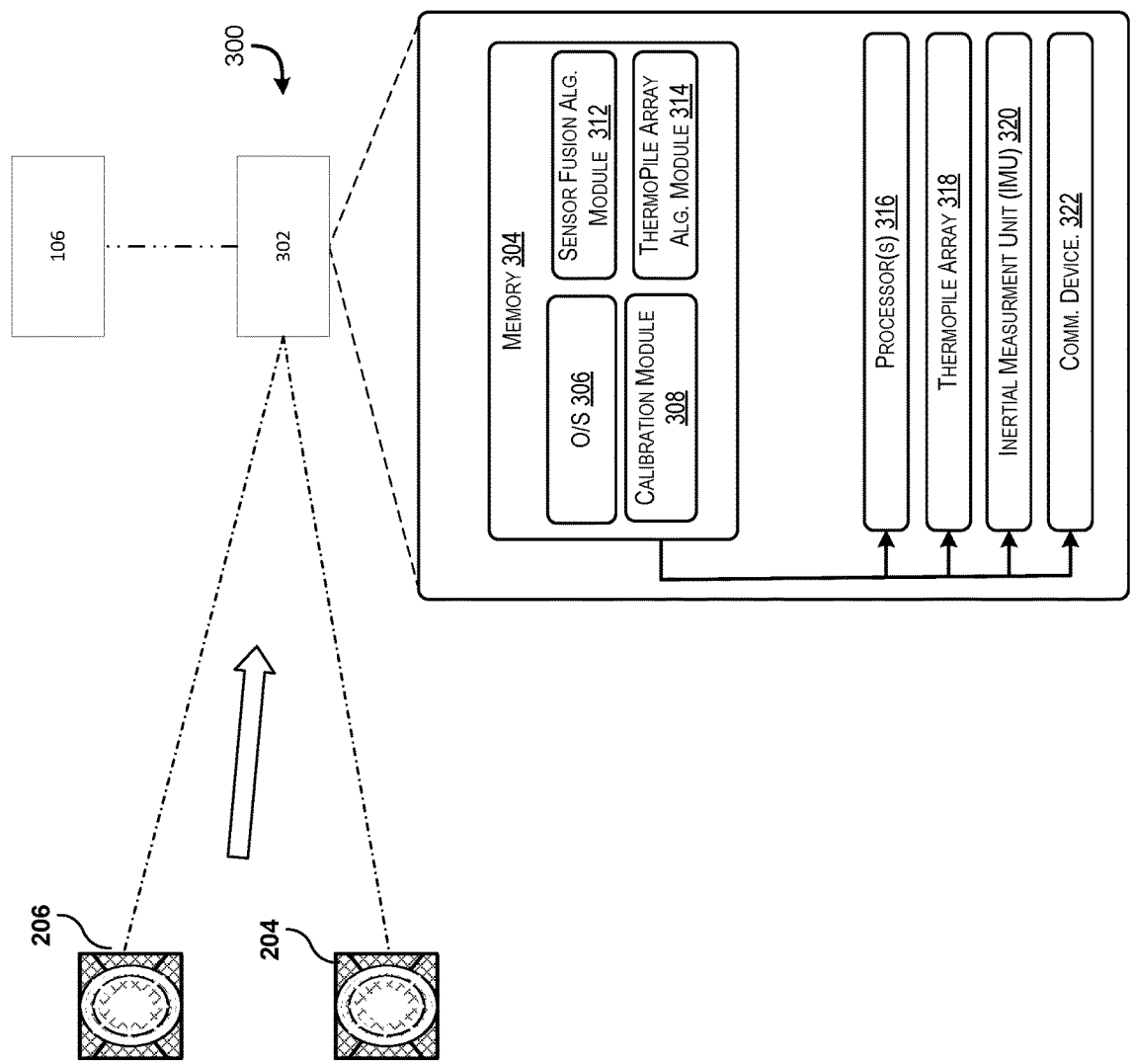
FIG. 3 is a block diagram of an example architecture for a user device utilizing a thermopile array to implement SLAM, according to an embodiment of the present disclosure.

FIG. 3 is a block diagram 300 of an example architecture for a user device 302 (which may correspond to user device 104 of FIG. 1 and/or user device 200 of FIG. 2) and utilizing a thermopile array to implement SLAM, according to an embodiment of the present disclosure. The user device 302 may include at least one memory 304, one or more processing units (or processor(s)) 316, a thermopile array 318, an IMU 320, and a communications device 322, among other components. The processor(s) 316 may be implemented as appropriate in hardware. The thermopile array 318 of the user device 302 may be configured to detect one or more thermal signals (e.g., infrared light) from one or more thermal beacons 204, 206. The communications device 322 may further be configured to communicate with a computing hub 106 (e.g., a video game console, virtual meeting server, etc.) using any suitable communication path. This may include, for instance, a wire or cable, fiber optics, a telephone line, a cellular link, a radio frequency (RF) link, a WAN or LAN network, the Internet, or any other suitable medium.

The memory 304 may store program instructions that are loadable and executable on the processor(s) 316, as well as data generated during the execution of these programs. Depending on the configuration and type of user device 302, the memory 304 may be volatile (such as random access memory (RAM)) and/or non-volatile (such as read-only memory (ROM), flash memory, etc.). In some implementations, the memory 304 may include multiple different types of memory, such as static random access memory (SRAM), dynamic random access memory (DRAM) or ROM. The user device 302 may also include additional storage (not shown), such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices.

Turning to the contents of the memory 304 in more detail, the memory 304 may include an operating system 306 and one or more application modules or services for implementing the features disclosed herein, including a calibration module 308, a sensor fusion algorithm module 312, and a thermopile array algorithm module 314. It should be understood that any of the tasks performed by one module may be performed by one or more of the other modules, and, as such, the module definitions provided herein are included for illustrative purposes.

The operating system 306 may provide executable program instructions for the general administration and operation of user device 302 and typically will include a computer-readable storage medium (e.g., a hard disk, random access memory, read only memory, etc.) storing instructions that, when executed by a processor of the user device 302, allow the user device 302 to perform its intended functions. Suitable implementations for the operating system are known or commercially available and are readily implemented by persons having ordinary skill in the art, particularly in light of the disclosure herein.

The calibration module 308 may be responsible for determining and maintaining in memory 304, a 3D model of a 3D space, wherein the 3D space may correspond to at least a portion of a physical space (e.g., gaming room 126). In some embodiments, the calibration module 308 may also be responsible for verifying that the thermopile array 318 of the user device 302, for a given position within the 3D space, can detect a thermal signal from at least two beacons of the plurality of beacons 110-124 (e.g., the beacons are within the field of view of one or more elements of the thermopile array). This helps to enable triangulation of location via the thermopile array algorithm module 314, discussed below. In some embodiments, the calibration module 308 may perform operations as described in FIG. 4. In one embodiment, and using FIG. 1's gaming room 126 as an example, the 3D model (which may be represented as a 3D wireframe model) corresponds to the 3D space in which the user 102 expects to operate the user device 104 within. For example, the user may only intend to operate the user device 104 within a portion of the gaming room near the center (and radiating out from the center some distance that is reachable by a human). The calibration module 308 may instruct the user to begin the calibration by moving the device to the center of the room 128 (e.g., where they primarily intend to operate the device) and then, while standing and turning in place, move the device 104 in a 360 degree visual sweep of the room, divided into smaller arc segments (e.g., 90 degree turns). At each segment, as described above, the user device 104 may verify at that at least two thermal beacons are within the field of view of the thermopile. Additionally, the user device 104 may determine and store in memory 304 the distance between the user device 104 and each thermal beacon 204, 206 visible within the arc segment. Once the user device 104 completes the sweep of the room, the calibration module 308 may use the location data determined between the user device 104 and each of the beacons 110-124 (relative to the center 128 of the room) to construct a 3D model of the 3D space. In some embodiments, the origin of the X, Y, and Z axes may be at the position (e.g., center 128) where the user 102 initially positioned the user device 104 during calibration. In some embodiments, a full 360 degree visual sweep may not be needed to perform calibration. For example, if the user 104 will typically be operating the user device 104 facing forward towards the TV 108, the calibration may only recommend a partial (e.g., 180 degree) sweep of the room. In that case, a smaller number of thermal beacons may be needed to pre-position in the room in order to construct the 3D model.

The sensor fusion algorithm module 312 may be responsible for determining a location of the user device 302. In some embodiments, the sensor fusion module 312 may be performed after calibration 308 has been performed. The sensor fusion module 312 may combine sensory data input from one or more sources to improve accuracy in determining the location of the user device 302. In an embodiment, the sensor fusion module 312 may receive thermal data as sensory input from the thermopile array 318 and IMU data as sensory input from the IMU 320.

In some embodiments, before combining the sensory input data from the different sensors, the sensor fusion module 312 may first execute a thermopile array algorithm module 314. The thermopile array algorithm module 314 may be responsible for triangulating, based on two or more distance values (e.g., corresponding to the distances between the user device 302 and at least two thermal beacons 204, 206), the location of the user device 302. The location (e.g., position) may be in the form of X, Y, and Z coordinates within the 3D model determined during calibration. In some embodiments, the thermopile array algorithm module 314 may, in addition to outputting a location, also output a confidence value that corresponds with the location. The confidence value may increase or decrease depending on the number of thermal beacons detected within the thermopile array's field of view (e.g., the number of distance values obtained). For example, if only one thermal beacon is detected, although the thermopile array algorithm module 314 may still output a location value, the corresponding confidence value may be low. Conversely, if two or more thermal beacons are detected within the field of view, the module 314 may output a high confidence value. In some embodiments, the user device 302 may execute the thermopile array algorithm module 314 on a certain frequency. For example, the module 314 may run at 120 Hz (approximately every 8.33 milliseconds). Typically, a higher frequency of generating an updated location based on the thermal data will improve location-tracking accuracy. For example, when fusing both thermal data and IMU data (discussed further below), more frequent location information based on thermal data will help to correct against drift error within the IMU data.

In another embodiment, and returning to the sensor fusion module 312 discussed above, the module 312 may receive location information (X, Y, and Z coordinates) from the thermopile array algorithm module 314 (e.g., after the algorithm 314 used the thermal data to determine a 3D location value and a corresponding confidence value) as well as location information (X, Y, and Z coordinates) from the IMU data from the IMU 320. The sensor fusion module 312 may combine (or "fuse") the different location data together using one or more of a number of algorithms and output a single location in 3D space with higher accuracy.

In one embodiment, the sensor fusion module 312 may employ an artificial intelligence model that is trained to utilize sensor data from disparate sources to determine a location of the user device 302. As used herein, the term "artificial intelligence" refers to any suitable computer-implemented artificial intelligence technique including machine learning (supervised or unsupervised), natural language processing, machine perception, computer vision, affective computing, statistical learning and classification (including use of hidden Markov models and Bayesian network models), reinforcement learning including neural networks, search algorithms and optimization algorithms (including evolutionary computing) and automated reasoning. As an example, a neural network may be trained to receive the IMU data, thermal data, and a previous location(s) data as input. This information may be used to output a corrected location of the user device 302 and/or to predict a next location where the user device 302 will be within a certain time interval.

In another embodiment, the sensor fusion module 312 may employ a fixed-point algorithm, such as employing a Kalman filter. The Kalman filter may use the sensory input data from the thermopile array, the IMU, and previous location data, to build a prediction model. The prediction model may take into account state variables (e.g., previous location(s), frequency of polling for thermal data, previous measurements of drift error, etc.).

Figure 4:
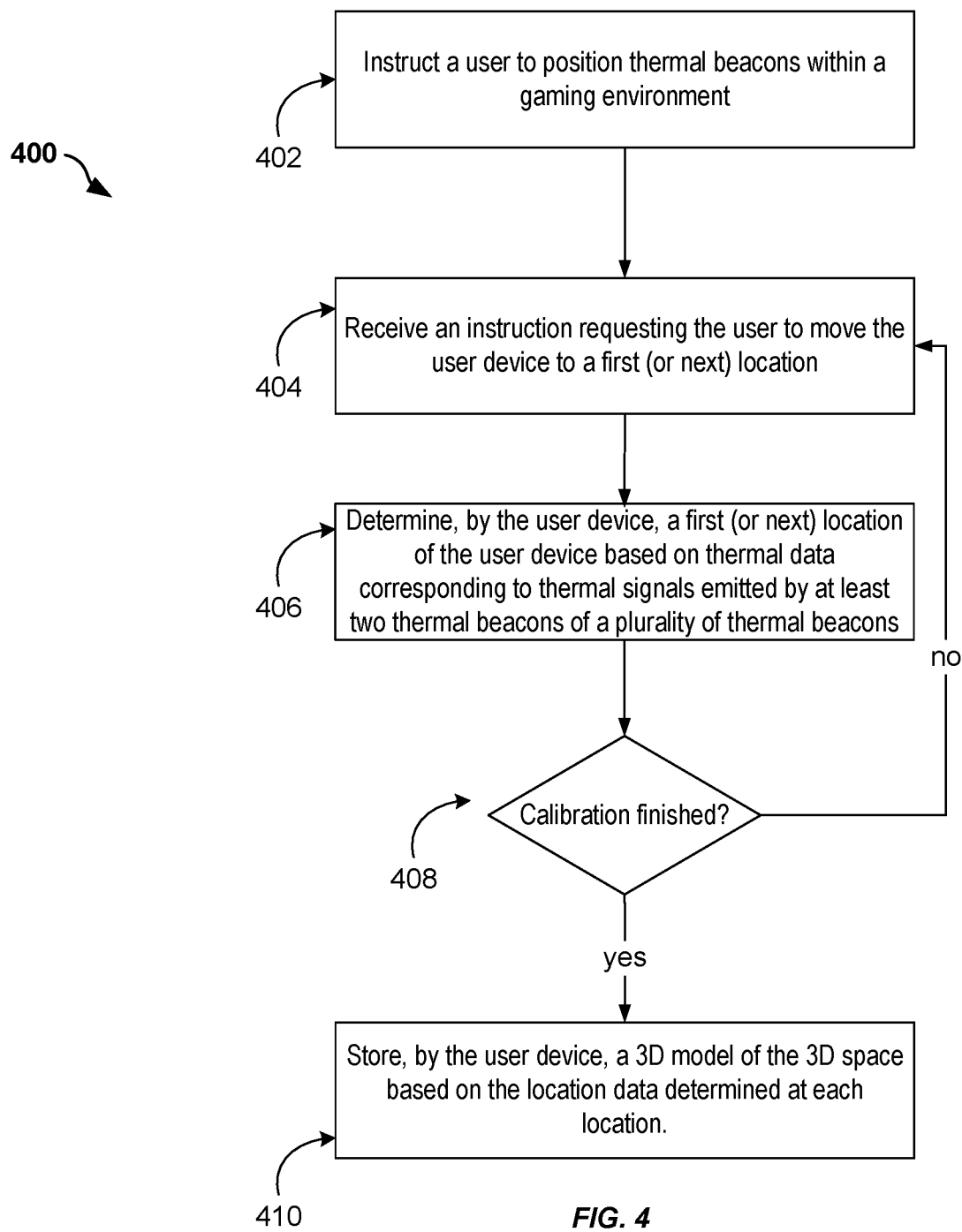
FIG. 4 illustrates an example flow for performing calibration of the user device, according to embodiments of the present disclosure.

FIG. 4 illustrates an example flow 400 for performing calibration of a user device 102 of the system 100 of FIG. 1, according to embodiments of the present disclosure. Although the operations are illustrated in a particular order, some of the operations can be re-ordered or omitted. Also, some or all of the flow 400 (or any other flows described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory.

In an example, the flow includes an operation 402, which involves positioning thermal beacons 110-124 within a physical space 126, which may be a gaming environment. Using the example of a video game system 100, a video game console 106 may prompt the user 102 (e.g., visually on a TV screen, audibly via a headset, or some other mechanism) to begin the calibration process by positioning thermal beacons 110-124 in the physical space 126 (e.g., game room). Depending on the type of gaming application, the video game console 106 may instruct the user on how many thermal beacons should be used and what degree of coverage (e.g., 360 degrees, 180 degrees, etc.) is recommended. For example, if the application requires the user 102 to be able to move the video game controller 104 (e.g., headset) in a 360 degree visual sweep of the perimeter of the room 126 while playing the game, then the user 102 may be recommended to place thermal beacons around the perimeter of the room, as depicted in FIG. 1. For example, the thermal beacons 110-124 may be positioned both in the center of the four walls 112, 116, 120, 124 and near the wall corners 110, 114, 118, 122. In this way, for a given position of the headset 104 within the gaming environment, the thermopile array 218 of the headset 104 may be able to detect thermal signals from at least two thermal beacons 204, 206 within its field of view.

In an example, the flow includes an operation 404, which involves receiving an instruction that requests the user to move the user device 104 to a first (or next) location. It should be understood that this instruction may come from directly from the user device 104 itself (e.g., an audio command from a headset), or from a computing hub 106 (e.g., video game console) that is communicatively connected to the user device 104. In the case where the instruction may come from the computing hub 106, the user device 104 may iterate through a next step (e.g., operation 406, discussed below) in the calibration process and then send a confirmation message (or information/error message) to the computing hub 106, which in turn may relay the next instruction message to the user 102.

In the case where the user 102 is being instructed to move the user device 104 to a first location, and continuing with the gaming example above, the headset 104 (e.g., via audio instruction, flashing light, etc.) may instruct the user 102 to move to the center of the room 128, which the user 102 intends to be the center of the gaming experience. The headset 104 may use this position 128 as the origin of the 3D model that the headset 104 builds and stores on the headset 104 as a result of the calibration process 400. It should be understood that the optimal location of the origin may depend on the type of application, and, in some embodiments, may not be in the center of a room. In some embodiments, the user 102 may then signal to the video game console 106 or the headset 104 that the user has completed the previous steps and is ready to proceed.

In an example, the flow includes an operation 406, where the user device 104 may determine a first (or next) location of the user device 104 based on thermal data corresponding to thermal signals emitted by at least two thermal beacons of a plurality of thermal beacons. In the case where the user device 104 is determining a first location, the user 102 may already be in place, based on the previous operation 404.

Continuing with the gaming example above, the headset's calibration module 308 may utilize thermal data received from the thermopile array 318 to determine at least two distance values, respectively, between the thermopile array 318 and at least two beacons 204, 206 within the thermopile array's 318 field of view. Based on this distance information, the calibration module 308 may triangulate the headset's position and store that position and the distance values in memory 304. In the event that the calibration module 308 is unable to detect at least two beacons within the field of view, it may prompt the user 102 with a warning (e.g., to check the positioning of the thermal beacons).

In some embodiments, at operation 408, once the calibration module 308 has determined a first (or next) location based on information from at least two thermal beacons within its field of view, the calibration module 308 may determine if the calibration is complete. In some embodiments, the calibration module 308 may perform this determination 410 by determining if it has enough information to construct a 3D model of the 3D space. In other embodiments, the calibration module 308 may pre-determine that it must capture all four sides of a room 126, and continually prompt the user to turn to a next position until it has capture data for all four sides. The calibration module 308 may use any suitable mechanism to determine if the calibration is completed. If the calibration is completed, then the flow may proceed to operation 412, described further below.

If the calibration procedure has not been completed, then the flow may loop back to operation 404, instructing the user to move to a next location (e.g., position). Continuing with the gaming example above, the headset 104 may output an audible instruction, tactile feedback, or any other suitable method to indicate to the user 102 to move to the next location. In one embodiment, the headset 104 may instruct the user to "turn in place approximately 90 degrees and then stop and wait for further instructions." The calibration module 308 may then continue with the calibration and perform operation 406, as discussed above. This loop may continue until the calibration is completed.

In an example, at operation 412, the calibration module 308 may determine that it has enough data to construct a 3D model of the physical space 126, with the first location serving as the origin of the 3D model. Each of the determined distances (e.g., to the thermal beacons 110-124) relative to the first location may be used to determine the dimensions of 3D model. In some embodiments, the calibration module 308 may use any suitable mechanism to construct the 3D model. Once the 3D model has been constructed, the calibration module 308 may store the model on the user device 302 (e.g., in memory 304, or other storage).

Figure 5:
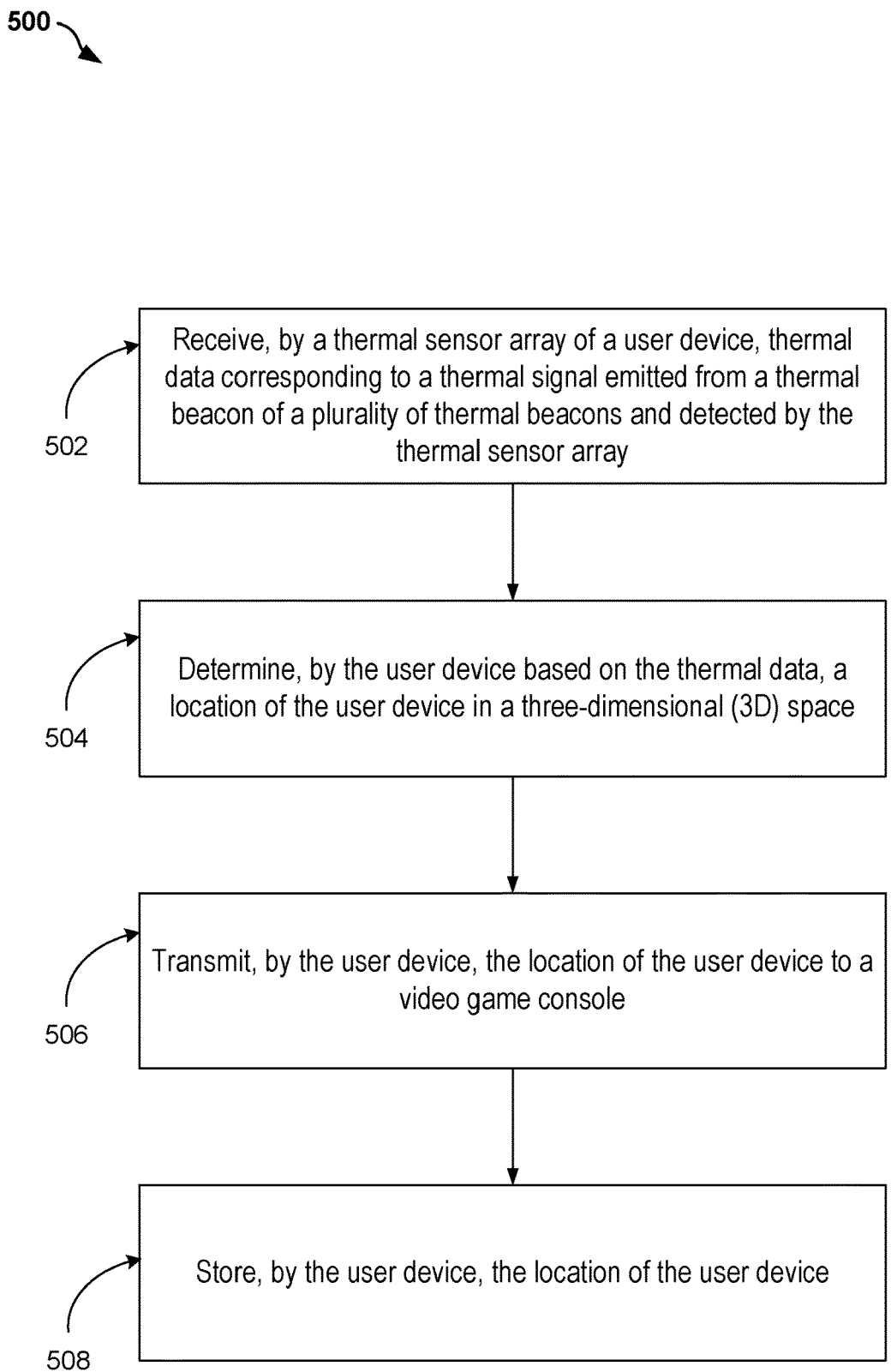
FIG. 5 illustrates an example flow for implementing SLAM on a user device that includes a thermopile array, according to embodiments of the present disclosure.

FIG. 5 illustrates an example flow 500 for implementing SLAM on a user device that includes a thermopile array, according to embodiments of the present disclosure. In some embodiments, flow 500 may be performed after the calibration flow 400 of FIG. 4 is performed and a 3D model of the 3D space has been generated. Although the flow operations below discuss utilizing a paddle as a user device (e.g., instead of a headset 104 within the video game system of FIG. 1), any suitable user device and/or system may be used.

In an example, at operation 502, the user device may receive thermal data corresponding to a thermal signal emitted from a thermal beacon of a plurality of thermal beacons, the thermal signal being detected by the thermal sensor array of the user device. The user 102 may operate a paddle to play virtual ping-pong, whereby the game involves the user moving the paddle into different positions as the user plays the game. The user 102 may also rotate the paddle and swing the paddle with different rates of acceleration. As described above, depending in part on the type of application, the frequency at which the paddle may poll the thermopile array 318 to receive thermal data may be increased to achieve higher location-tracking accuracy with respect to time. In some embodiments, this may involve the thermopile array algorithm module 314 receiving a voltage reading (corresponding to a particular thermal beacon's IR light signal) from the thermopile array at a frequency of at least 120 Hz (e.g., receiving an update approximately every 8.33 milliseconds).

In an example, at operation 504, the user device (e.g., paddle) may determine its location in 3D space, based on the data received from the thermopile array. Specifically, in some embodiments, for each voltage reading, the thermopile array algorithm module 312 may compute an associated distance to a thermal beacon. As described above, the module 314 may then triangulate its location using thermal signals from at least two thermal beacons. In some embodiments, the module 312 may use the 3D model of the 3D space within the gaming room 126 (previously stored during the calibration process) to determine the location of the paddle in the 3D space. In some embodiments, the paddle may utilize a confidence value (e.g., generated by the thermopile array algorithm module 314) to determine its location. If, for example, at a particular time, only one thermal beacon was detected, the confidence value may be lower. As such, the paddle may determine to disregard that location value, combine it with other location data to improve accuracy, or perform any other suitable behavior. It should be understood that, in some embodiments, the paddle may utilize only thermal data (apart from other sensor data) to determine the paddle's location. However, in other embodiments, the paddle may utilize, in addition to thermal data, other sensory input (e.g., IMU data) and/or variables to determine the paddle's location, which may be further input into a sensory fusion algorithm 312 for combining (as discussed in FIG. 6 below).

It should be understood that, contrasted with other SLAM applications that may require computing external to the user device 104 to determine the user device's location (e.g., external optical sensors, processing by a video game console, etc.), one technical advantage of the present disclosure is that it enables the user device 104 to determine its location using its own internal components (based in part on thermal signals received from the thermal beacons). This may improve system reliability, for example, in terms of reducing network connectivity issues such as latency, bandwidth limitations, etc.

In an example, at operation 506, and continuing with the example above, the paddle may transmit the location of the paddle to the video game console 106. In some embodiments, the location data may be transmitted by the communications device 322 using any suitable communications path (e.g., WiFi), as discussed above. The video game console 106 may process the location data using any suitable mechanism. In one example, the video game console 106 may use the location data to move an object being displayed on the TV 108 (that corresponds to the paddle) to a new location, wherein the new location corresponds to the change of the paddle's location in the 3D space of the gaming room 126.

In an example, at operation 508, the user device 104 may store its own location on the user device 104. In some embodiments, previous location data may be in the form of X, Y, and Z coordinates that correspond to the 3D model previously generated during calibration (see FIG. 4). The previous location data may be stored in memory 304 of the user device 104. In some embodiments, the memory 304 may store a history of previous locations, whereby a sensor fusion algorithm 312 of the user device 104 (e.g., employing a machine learning algorithm or fixed-point algorithm) may use one or more of the historical location data points as input to determine the user device's 104 current location. In yet other embodiments, historical location data may be used by an algorithm to predict a future location.

Figure 6:
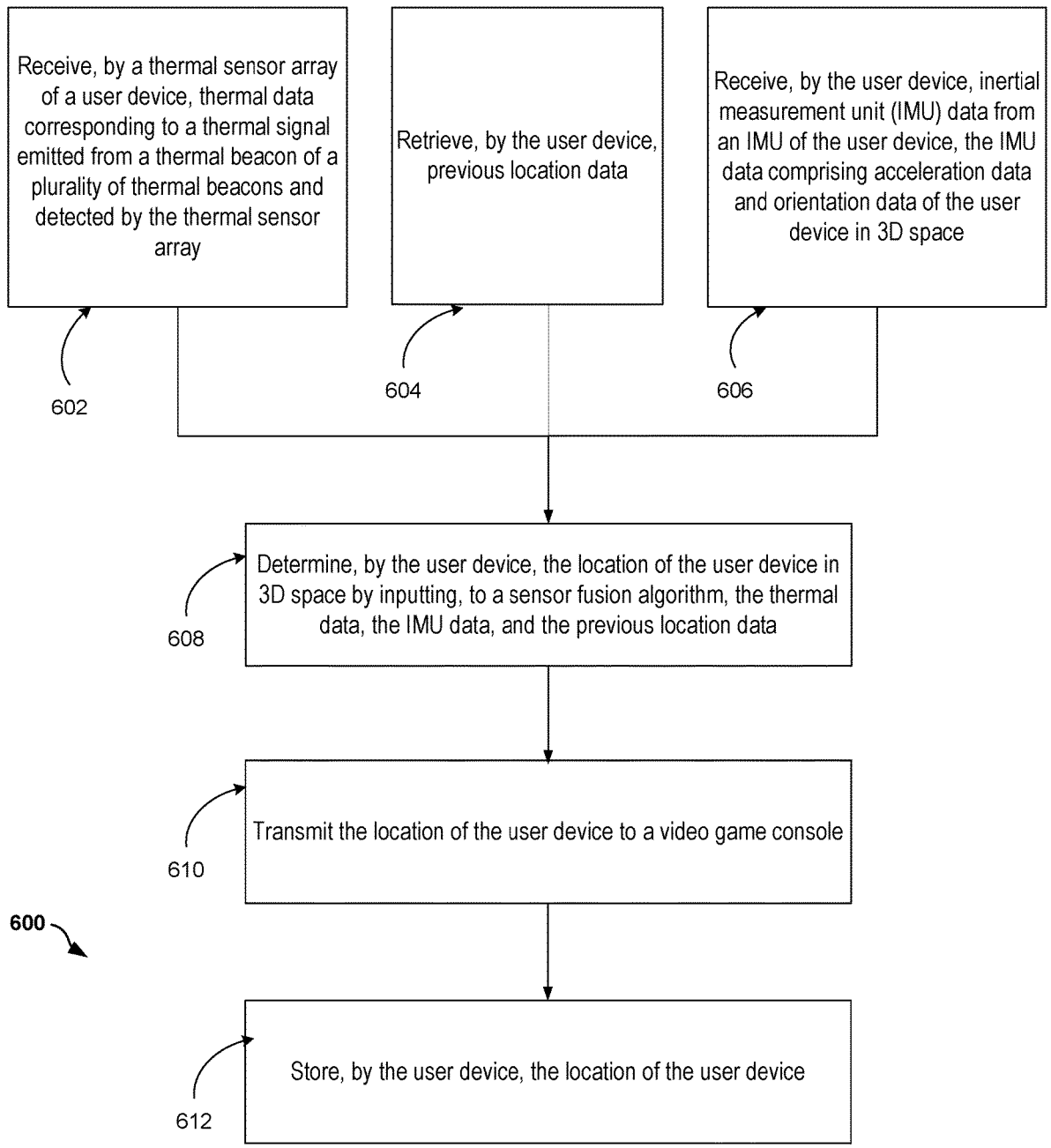
FIG. 6 illustrates an example flow for implementing SLAM on a user device that includes a thermopile array and an IMU, according to embodiments of the present disclosure.

FIG. 6 illustrates an example flow 600 for implementing SLAM on a user device that includes a thermopile array and an IMU, according to embodiments of the present disclosure. Similar to the flow 500 of FIG. 5, flow 600 may be performed after the calibration flow 400 of FIG. 4 is performed and a 3D model of the 3D space has been generated. Also, similar to flow 500, although the flow operations below discuss utilizing a paddle as a user device 104 within the video game system of FIG. 1, any suitable user device and/or system may be used. In some embodiments, flow 600 includes example operations that can be implemented as sub-operations of the example flow 500.

In an example, at operation 602, similar to operation 502 of FIG. 5, the user device may receive thermal data corresponding to a thermal signal emitted from a thermal beacon of a plurality of thermal beacons, the thermal signal being detected by the thermal sensor array of the user device. In some embodiments, this data may be further processed by the thermopile array algorithm module 314.

In an example, at operation 604, the user device may retrieve previous location data that was stored on the user device. For example, this may be data that was stored by a previous operation 608. In some embodiments, previous location data may be in the form of X, Y, and Z coordinates that correspond to the 3D model previously generated during calibration (see FIG. 4). In other embodiments, the previous location data may also include other data, including, but not limited to, inertial data (e.g., rotational rate, linear acceleration of the user device in 3D space at a point in time). This data may be received by one or more sensor units devices of the user device 302 (e.g., IMU 320), as discussed further below.

In an example, at operation 606, the user device may receive IMU data from an IMU 320 of the user device. In some embodiments, the IMU data may include acceleration data, orientation data, and/or rotation data of the user device in 3D space, as discussed in reference to IMU 214 of FIG. 2. Accordingly, the IMU data may also be used to determine the location of the user device in 3D space at a point in time.

In an example, at operation 608, the user device may determine its location in 3D space by inputting thermal data (e.g., received at operation 602), previous location data (e.g., received at operation 604), and/or IMU data (e.g., received at operation 606) into a sensor fusion algorithm (which may correspond to the sensor fusion algorithm module 312 of FIG. 3). In some embodiments, other sensory input from other sensors may be also used as input to the sensor fusion algorithm, including, but not limited to, a global positioning system (GPS) tracker. In some embodiments, each of the data received by the sensor fusion algorithm from operations 602 and 606 may correspond to data measuring a location of the user device at substantially the same point in time. However, in other embodiments, the data received by the sensor fusion algorithm from operations 602 and 606 may correspond to data measuring a location of the user device at different time intervals. In an example, and similar to as discussed above regarding operation 502, the thermopile array algorithm 314 may determine the user device location based on thermal data from the thermopile array 318 at a frequency of 120 Hz (e.g., updating every 8.33 milliseconds). In contrast and for example, a 20 Hz IMU may output an acceleration rate and rotational rate for a sample period representing the total motion of the IMU over 50 milliseconds. The sensor fusion algorithm 312 may use the location data from derived from the thermopile array as a drift correction factor to correct for drift errors within the IMU location data. The sensor fusion algorithm may also utilize previous location data from operation 604 to increase the algorithm's accuracy, as discussed above.

In an example, at operation 610, and similar to operation 506 from FIG. 5, the user device transmits its location that it determined in operation 608 to the video game console.

In an example, at operation 612, and similar to operation 508 from FIG. 5, the user device may store its own location on the user device.

Figure 7:
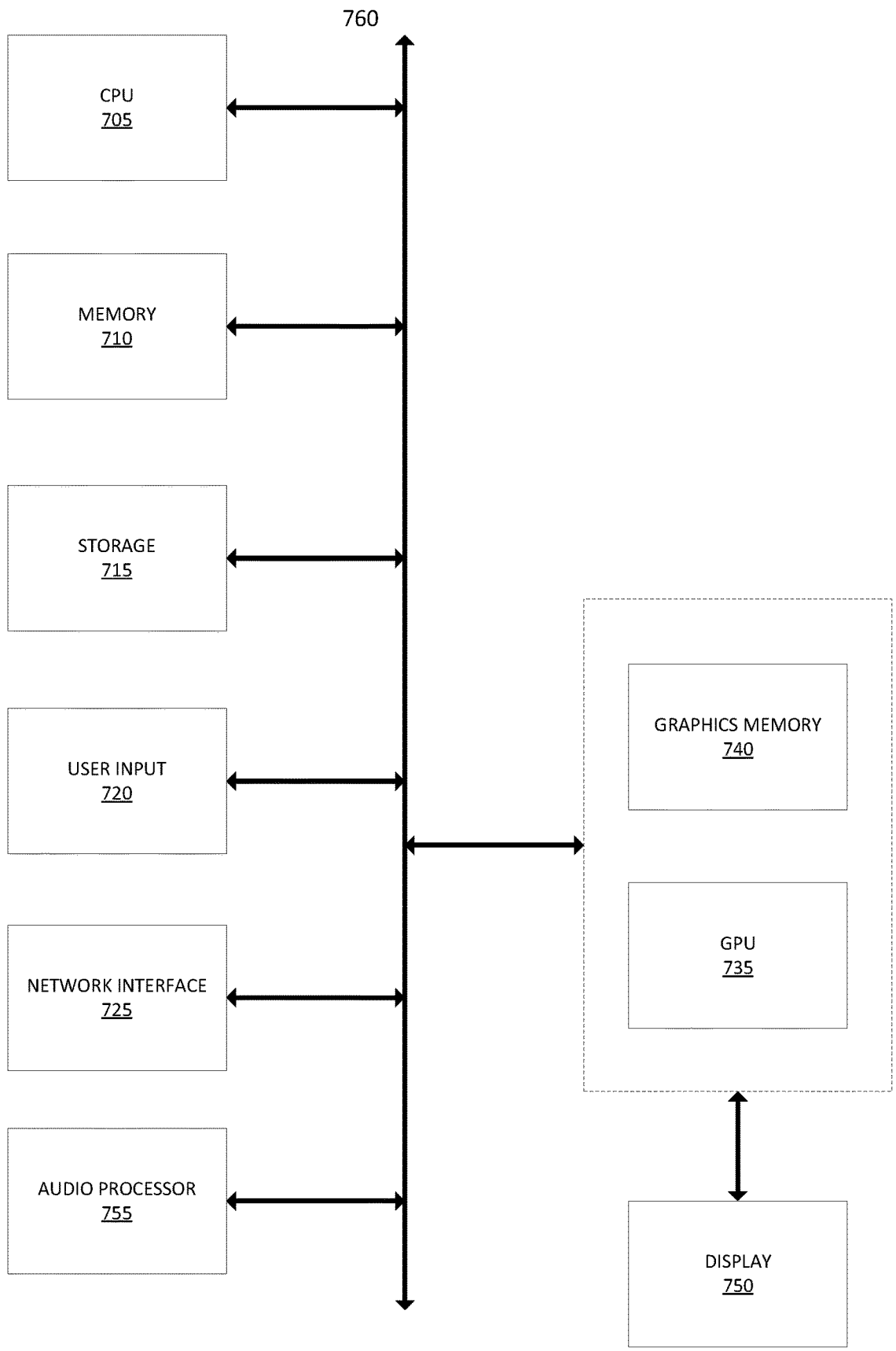
FIG. 7 illustrates an example of a hardware system suitable for implementing a computer system, according to embodiments of the present disclosure.

FIG. 7 illustrates an example of a hardware system suitable for implementing a computer system 700 in accordance with various embodiments. The computer system 700 represents, for example, components of a video game system, a mobile user device, a proximity device, a wearable gesture device, and/or a central computer. The computer system 700 includes a central processing unit (CPU) 705 for running software applications and optionally an operating system. The CPU 705 may be made up of one or more homogeneous or heterogeneous processing cores. Memory 710 stores applications and data for use by the CPU 705. Storage 715 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 720 communicate user inputs from one or more users to the computer system 700, examples of which may include keyboards, mice, joysticks, touch pads, touch screens, still or video cameras, and/or microphones. Network interface 725 allows the computer system 700 to communicate with other computer systems via an electronic communications network, and may include wired or wireless communication over local area networks and wide area networks such as the Internet. An audio processor 755 is adapted to generate analog or digital audio output from instructions and/or data provided by the CPU 705, memory 710, and/or storage 715. The components of computer system 700, including the CPU 705, memory 710, data storage 715, user input devices 720, network interface 725, and audio processor 755 are connected via one or more data buses 760.

A graphics subsystem 730 is further connected with the data bus 760 and the components of the computer system 700. The graphics subsystem 730 includes a graphics processing unit (GPU) 735 and graphics memory 740. The graphics memory 740 includes a display memory (e.g., a frame buffer) used for storing pixel data for each pixel of an output image. The graphics memory 740 can be integrated in the same device as the GPU 735, connected as a separate device with the GPU 735, and/or implemented within the memory 710. Pixel data can be provided to the graphics memory 740 directly from the CPU 705. Alternatively, the CPU 705 provides the GPU 735 with data and/or instructions defining the desired output images, from which the GPU 735 generates the pixel data of one or more output images. The data and/or instructions defining the desired output images can be stored in the memory 710 and/or graphics memory 740. In an embodiment, the GPU 735 includes 3D rendering capabilities for generating pixel data for output images from instructions and data defining the geometry, lighting, shading, texturing, motion, and/or camera parameters for a scene. The GPU 735 can further include one or more programmable execution units capable of executing shader programs.

The graphics subsystem 730 periodically outputs pixel data for an image from the graphics memory 740 to be displayed on the display device 750. The display device 750 can be any device capable of displaying visual information in response to a signal from the computer system 700, including CRT, LCD, plasma, and OLED displays. The computer system 700 can provide the display device 750 with an analog or digital signal.

In accordance with various embodiments, the CPU 705 is one or more general-purpose microprocessors having one or more processing cores. Further embodiments can be implemented using one or more CPUs 705 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A video game system comprising:
   a video game console;
   a plurality of thermal beacons; and
   a user device communicatively coupled with the video game console, the user device comprising:
   a thermopile array;
   a processor; and
   a memory storing instructions that, upon execution by the processor, cause the processor to:
   receive thermal data from the thermopile array, the thermal data corresponding to a number of thermal signals each emitted from a different one of a number of thermal beacons of the plurality of thermal beacons and detected by the thermopile array;

determine, based on the thermal data and on a confidence value associated with the number of thermal beacons, a location of the user device in a three-dimensional (3D) space; and transmit the location of the user device to the video game console.

2. The video game system of claim 1, wherein the user device further comprises an inertial measurement unit (IMU), wherein the execution of the instructions further causes the processor to:

receive IMU data from the IMU, the IMU data comprising acceleration data corresponding to an acceleration of the user device in the 3D space and orientation data corresponding to a rotational rate of the user device in the 3D space; and determine the location of the user device in the 3D space by inputting, to a sensor fusion algorithm, the thermal data, the IMU data, and previous location data.

3. The video game system of claim 1, wherein the user device further comprises an inertial measurement unit (IMU), wherein the execution of the instructions further causes the processor to:

determine an initial location based on the thermal data and independent of IMU data of the IMU.

4. The video game system of claim 1, wherein the thermal data corresponds to a first thermal signal from a first thermal beacon of the plurality of thermal beacons, wherein execution of the instructions further causes the processor to:

receive second thermal data from the thermopile array, the second thermal data corresponding to a second thermal signal emitted from a second thermal beacon of the plurality of thermal beacons and detected by the thermopile array, wherein the thermal beacon and the second thermal beacon are simultaneously in a field of view of the thermopile array, and wherein the location of the user device is further determined based on the second thermal data.

5. The video game system of claim 1, wherein each beacon of the plurality of thermal beacons is an infrared diode.

6. The video game system of claim 1, wherein the thermal signal comprises an identifier unique to a thermal beacon, wherein the identifier is used by the thermopile array to identify the thermal beacon from the plurality of thermal beacons.

7. The video game system of claim 1, wherein each thermal beacon of the plurality of thermal beacons is positioned in a gaming environment, the 3D space being mapped to a portion of the gaming environment, the thermal beacons being positioned such that, for a particular position of the user device within the 3D space, the thermopile array can detect thermal signals from at least two thermal beacons.

8. The video game system of claim 1, wherein the execution of the instructions further causes the processor to:

generate a 3D model of the 3D space based on previous thermal data received from the thermopile array; and determine the location of the user device in the 3D space by locating the user device in the 3D model based on the thermopile data.

9. The video game system of claim 1, wherein the thermal data corresponds to at least a first thermal signal emitted by a first thermal beacon and a second thermal signal emitted by a second thermal beacon, wherein the first thermal beacon and the second thermal beacon are in the field of view of the thermopile array, and wherein determining the location of the user device comprises triangulating the user device based on the thermal data.

10. The video game system of claim 1, wherein the user device further comprises a sensor other than the thermopile array, wherein the execution of the instructions further causes the processor to:

receive sensor data from the sensor; and determine the location of the user device in the 3D space by inputting, to a sensor fusion algorithm the thermal data and the sensor data, the fusion algorithm implementing a simultaneous localization and mapping (SLAM) process based on the thermal data and sensor data to output the location.

11. A user device comprising:

a thermopile array;

a processor; and a memory storing instructions that, upon execution by the processor, cause the processor to:

receive thermal data from the thermopile array, the thermal data corresponding to a number of thermal signals each emitted from a different one of a number of thermal beacons of a plurality of thermal beacons and detected by the thermopile array;

determine, based on the thermal data and on a confidence value associated with the number of thermal beacons, a location of the user device in a three-dimensional (3D) space; and transmit the location of the user device to a video game console.

12. The user device of claim 11, wherein the user device further comprises an inertial measurement unit (IMU), wherein the execution of the instructions further causes the processor to:

receive IMU data from the IMU, the IMU data comprising acceleration data corresponding to an acceleration of the user device in the 3D space and orientation data corresponding to a rotational rate of the user device in the 3D space; and determine the location of the user device in the 3D space by inputting, to a sensor fusion algorithm the thermal data, the IMU data, and previous location data.

13. The user device of claim 12, wherein the previous location data is stored on the user device.

14. The user device of claim 12, wherein the sensor fusion algorithm utilizes an artificial intelligence model trained to determine the location.

15. The user device of claim 12, wherein the sensor fusion algorithm generates the confidence value corresponding to the thermal data, the confidence value based on the number of thermal beacons that are in a field of view of the thermopile array, the confidence value being used by the sensor fusion algorithm to determine the location.

16. The user device of claim 11, wherein the user device is a video game controller.

17. The user device of claim 11, wherein each thermal beacon of the plurality of thermal beacons is positioned in a gaming environment, the 3D space being mapped to a portion of the gaming environment, the thermal beacons being positioned such that, for a particular position of the user device within the 3D space, one or more thermal sensors of the thermopile array can detect thermal signals from at least two thermal beacons.

18. A non-transitory computer-readable storage medium storing instructions that, upon execution on a user device, configure the user device to perform operations comprising:

generating, by a thermopile array of the user device, thermal data corresponding to a number of thermal signals each emitted from a different one of a number of thermal beacons of a plurality of thermal beacons and detected by one or more thermal sensors of the thermopile array;

determining, based on the thermal data and on a confidence value associated with the number of thermal beacons, a location of the user device in a three-dimensional (3D) space; and transmitting, by the user device, the location of the user device to a video game console, the user device being communicatively coupled with the video game console.

19. The non-transitory computer-readable storage medium of claim 18, wherein the operations further comprise performing a calibration by:

determining a first location of the user device based on first thermal data corresponding to first thermal signals emitted from a first set of thermal beacons of the plurality of thermal beacons that are positioned in the 3D space;

determining a second location of the user device based on second thermal data corresponding to second thermal signals emitted from a second set of thermal beacons of the plurality of thermal beacons that are positioned in the 3D space;

generating, by the user device, based on the first location and the second location, a 3D model of the 3D space; and storing, by the user device, the 3D model.

20. The non-transitory computer-readable storage medium of claim 19, wherein the performing the calibration further comprises:

receiving, by the user device, an instruction that requests a user to move the user device to the first location; and responsive to the determining the first location, receiving, by the user device, an instruction that requests the user to move the user device to the second location.

* * * * *